Patented Feb. 22, 1944

2,342,520

UNITED STATES PATENT OFFICE 2,342,520

LUSTER-IMPARTING SURFACE COATING COMPOSITION

Kurt Stickdorn, Dessau-Rosslau, Germany; vested in the Alien Property Custodian

No Drawing. Application October 20, 1939, Serial No. 300,406. In Germany October 15, 1938

5 Claims. (Cl. 106—10)

It has been found that the halogen-hydracid salts of organic compounds containing at least one higher molecular aliphatic radical and at least one amino group are advantageously applied as wax-substitutes especially in the manufacture of surface-treating preparations. These salts have an excellent oil-binding power. Moreover, in contradistinction to the well known natural or artificial waxes normally used in wax-compositions, surface treating preparations, etc., they do not incline to crystallization. As is known crystallization is disadvantageous and precludes obtaining of a homogeneous structure in such compositions.

The amine salts of the present invention may contain one or several primary and/or secondary or also tertiary amino groups and are obtained preferably from purely aliphatic amines such as tetradecylamine, hexadecylamine, octadecylamine, behenylamine, cerotylamine, cerylamine, montanylamine and the like. Such amines may be produced by ammoniacal hydrogenation of the corresponding carbonic acids or also by reactions involving ammonia and the corresponding alkyl-chlorides. Other raw materials include amines of the type of 18-amino-pentatriacontane obtainable by ammoniacal hydrogenation of higher molecular ketones such as stearone, behenone, montanone and the like. Secondary and tertiary amines which may be used as raw materials include di-cetylamine, di-octadecylamine, octadecylmethylamine, montanyldimethylamine, tricetylamine and the like. Additional suitable higher molecular amines include high molecular mixed amines, i. e., aliphatic-cycloaliphatic and aliphatic-aromatic amines with one or several amino groups in the nucleus and in certain cases also cyclohexylamines having substituted on the nitrogen atom higher molecular alkyl radicals as well as phenyl- and naphthyl-amines, tetrahydronaphthyl-amines and the like.

The aliphatic hydrocarbon radicals of the amines must contain a straight or branched hydrocarbon-chain of no less than 12 C-atoms and the most valuable amines have an aliphatic hydrocarbon chain of 18 or more C atoms substituted on the nitrogen atom. The hydrocarbon radicals may also contain hetero-atomic or hetero-atom groups such as oxygen, sulfur and nitrogen or any known atom groups containing these atoms.

The amines are converted into the corresponding halogen-hydracid salts by well known procedures. From the commercial point of view hydrochloric acid salts are to be preferred but the other halogen-hydracid salts are suitable also.

The wax-substitutes of the present invention are advantageously used in the manufacture of surface-treating preparations for wood, linoleum, stone, artificial stone, artificial materials, leather and the like; for the production of many varieties of wax-impregnations or wax-coatings, e. g. for textiles, paper, millboard, wood and the like; for the manufacture of dyeing- and printing-pastes, stencils, etc.; and for the production of grafting wax, insectcatching-limes, etc. They may also be applied in combination with hitherto known waxes and wax-substitutes such as paraffin, mineral wax, vegetable and animal waxes, lignite wax, synthetical waxes and the like. They are readily compatible with the usual organic solvents.

Example 1

The mixture of the saturated aliphatic alcohols with 18 to 22 C atoms obtainable by high pressure hydrogenation of rape seed oil, is converted into the corresponding alkyl chlorides by the usual methods, e. g. by means of gaseous hydrochloric acid in the presence of zinc chloride. These alkyl chlorides are treated under pressure with ammonia at temperatures between 140 and 200° C. After the usual manipulation the mixture of aliphatic, primary and secondary amines with hydrocarbon radicals of 18 to 22 C atoms, are separated out by distilling off a fore-running of about 15% of the total reaction product. Then sufficient hydrochloric acid for neutralization is produced into the melted product. The hydrochloric acid salt obtained in this way forms a wax melting at 72° C. and is most suitable for the manufacture of floor-polishing masses, shoe-creams, etc.

Example 2

Montan acid glycol ester is hydrogenated in a hydrogenating autoclave and in the presence of a copper-manganese-catalyst at an ammonia partial overpressure of 15 atm. and a hydrogen partial overpressure of 150 atm. and at a temperature of 260° C. to form an amine mixture. After separating the catalyst and after eliminating a fore-running of 5% by distilling in a partial vacuum, the reaction product is neutralized by gaseous chloro-hydracid. We thus obtain a hard wax of a very good oil-binding power, which imparts a fine brilliancy. It is advantageously applicable in the manufacture of surface-treating preparations, for wax-impregnations and wax-coatings.

Six parts by weight of the described wax mixed with 5 parts by weight of ozocerite, 19 parts by weight of paraffin, 9 parts by weight of turpentine oil and 61 parts by weight of heavy benzine, make a very good floor polish.

*Example 3*

Stearic acid is converted into stearone by heating in an autoclave at 310° C. with 2% of iron-filings. The stearone is then washed with aqueous hydrochloric acid to eliminate the iron, whereupon it is distilled in a partial vacuum (at 1 mm. Hg-pressure) and hydrogenated at 200° C. at a partial ammonia pressure of 15 atm. and a partial hydrogen pressure of 60 atm. in the presence of a nickel-catalyst. After eliminating the catalyst and after expelling the ammonia, hydrogenation product consisting of pentatricontane is neutralized with gaseous hydrochloric acid.

Six parts by weight of this wax are worked in a known manner into a polishing mass by mixing it with 6 parts by weight of ozocerite (melting point 67° C.), 18 parts by weight of paraffin (melting point 50 to 52° C.) and 70 parts by weight of heavy benzine. This preparation imparts a high brilliancy. It is homogeneously bound and produces a lustrous surface.

What I claim is:

1. A luster-imparting surface coating composition comprising the following ingredients in substantially the following portions by weight, 6 parts of the hydrochloric acid salt of an aliphatic amine substituted only by an aliphatic hydrocarbon derived from the catalytic hydrogenation of montan acid glycol ester, 5 parts of ozocerite, 19 parts of paraffin, 9 parts of turpentine oil and 61 parts of benzine.

2. A luster-imparting surface coating composition comprising the following ingredients in substantially the following portions by weight, 6 parts of the hydrochloric acid salt of 18-amino-pentatriacontane, 6 parts of ozocerite, 18 parts of paraffin and 70 parts of benzine.

3. A luster-imparting surface coating composition comprising the hydrochloric acid salt of an aliphatic amine substituted only by a montanyl radical, ozocerite, paraffin, turpentine oil and benzine.

4. A luster-imparting surface coating composition comprising the hydrochloric acid salt of 18-amino-pentatriacontane, ozocerite, paraffin, and benzine.

5. A luster-imparting surface coating composition comprising a hydrochloric acid salt of an aliphatic amine substituted only by an aliphatic hydrocarbon radical of at least 18 carbon atoms, ozocerite, paraffin, and benzine.

KURT STICKDORN.